(No Model.)  3 Sheets—Sheet 1.
G. MULLER.
CABLE RAILWAY CURVE.
No. 481,412. Patented Aug. 23, 1892.
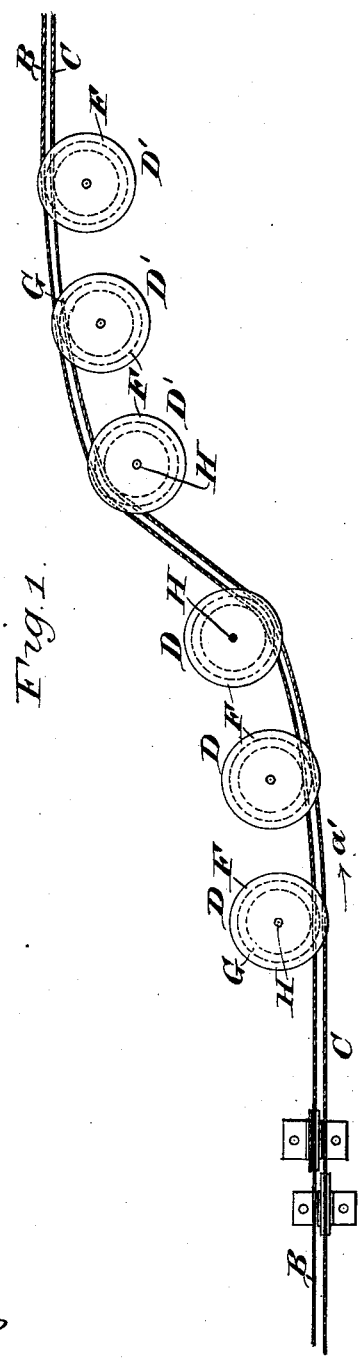
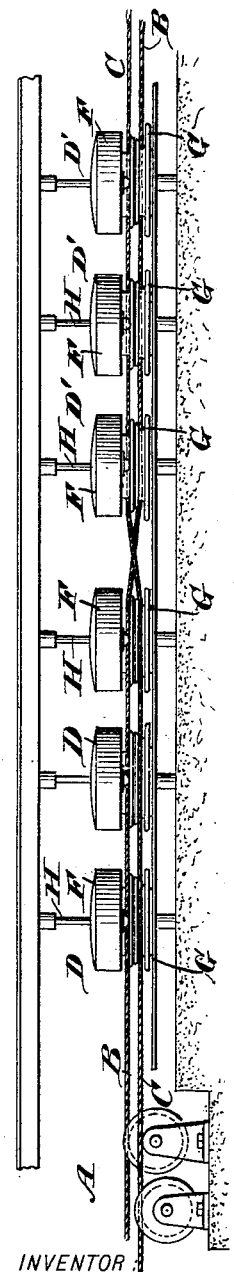
WITNESSES:
INVENTOR:
G. Muller
BY Munn & Co.
ATTORNEYS (No Model.) 3 Sheets—Sheet 2.
G. MULLER.
CABLE RAILWAY CURVE.
No. 481,412. Patented Aug. 23, 1892.
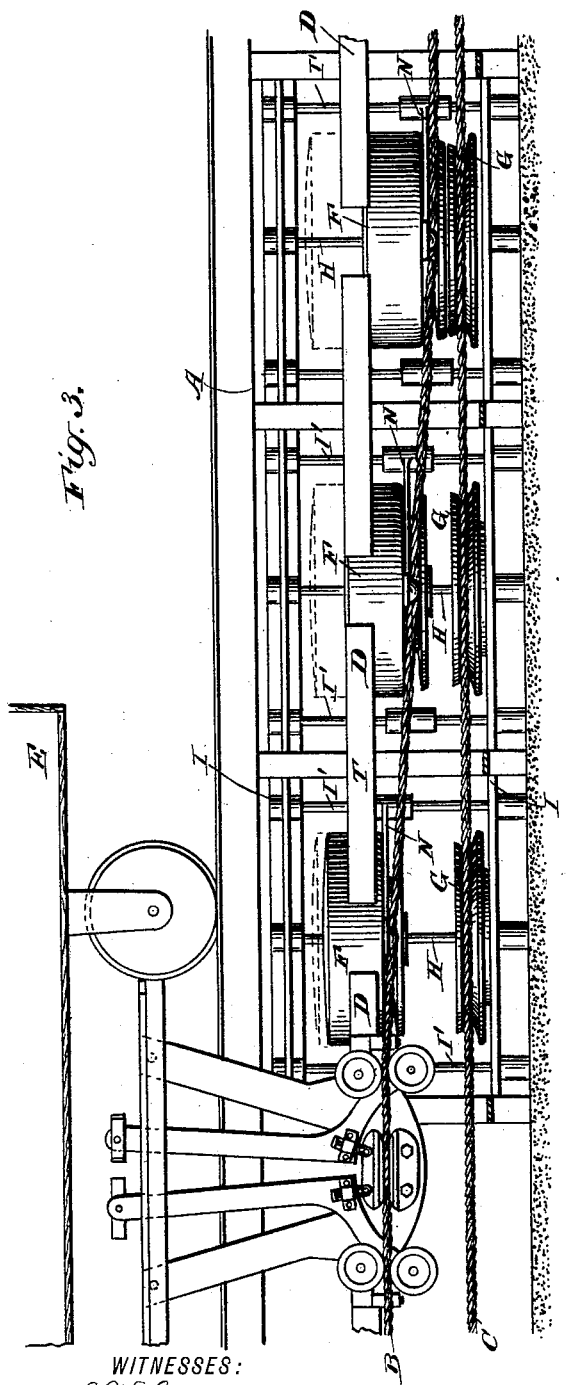
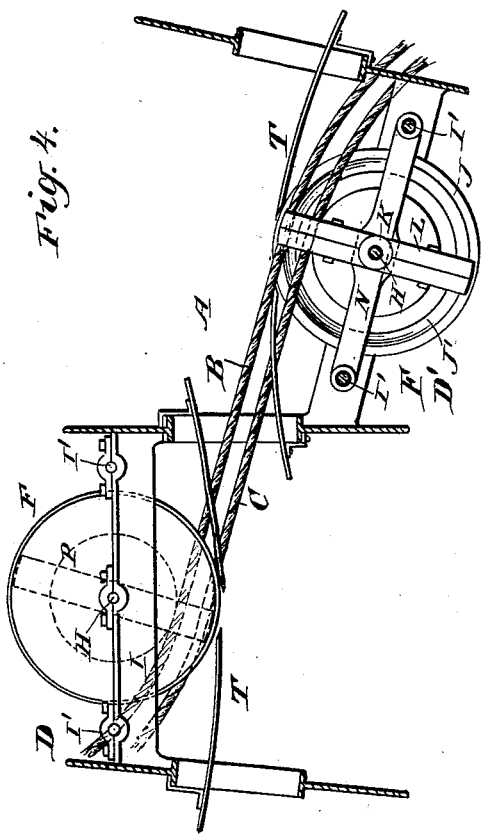
WITNESSES:
INVENTOR
BY
ATTORNEYS.

(No Model.) 3 Sheets—Sheet 3.

G. MULLER.
CABLE RAILWAY CURVE.

No. 481,412. Patented Aug. 23, 1892.

WITNESSES:
J. A. Criswell.
C. Sedgwick

INVENTOR
G. Muller
BY Munn & Co.
ATTORNEYS.

UNITED STATES PATENT OFFICE.

GEORGE MULLER, OF HOBOKEN, NEW JERSEY.

CABLE-RAILWAY CURVE.

SPECIFICATION forming part of Letters Patent No. 481,412, dated August 23, 1892.

Application filed October 19, 1891. Serial No. 409,177. (No model.)

*To all whom it may concern:*

Be it known that I, GEORGE MULLER, of Hoboken, in the county of Hudson and State of New Jersey, have invented a new and useful Improvement in Cable-Traction Systems, of which the following is a full, clear, and exact description.

The invention relates to cable-traction having a duplex-cable system and is designed more especially for use on curves on the road-bed.

The object of the invention is to provide certain new and useful improvements in cable-traction, whereby either cable can conveniently be used on a curve and without one cable interfering or coming in contact with the other.

The invention consists principally of two sets of supporting devices arranged on opposite sides of the cables to pass one cable over and above the other.

The invention further consists of two cables entering the curve one above the other and a device for passing and guiding and crossing the lower cable over and above the other, so that on leaving the curve the positions of the cables are reversed.

The invention also consists of certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 5:
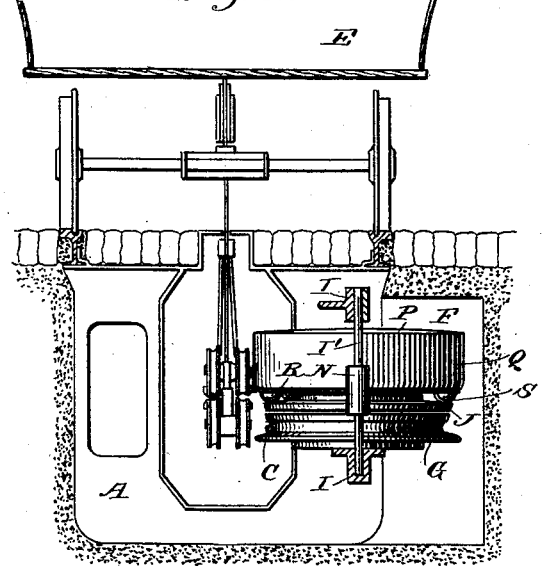
Figure 6:
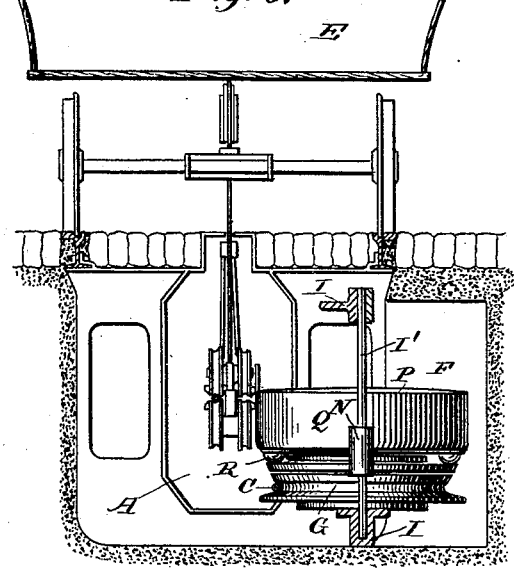
Figure 7:
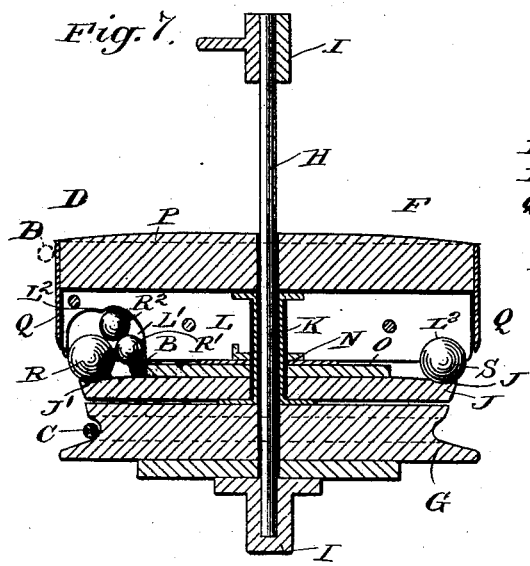
Figure 8:
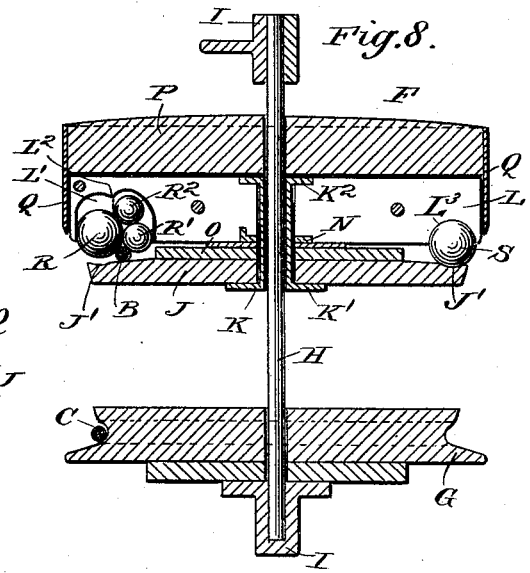
Figure 9:
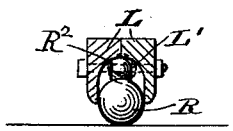

Figure 1 is a plan view of the improvement as applied on an S-curve. Fig. 2 is a side elevation of the same. Fig. 3 is an enlarged side elevation of the improvement, illustrating about one-half of the arrangement on an S-curve. Fig. 4 is a plan view of the improvement at the crossing-point. Fig. 5 is a transverse section of the improvement at an ordinary quarter-curve. Fig. 6 is a like view of the improvement at the middle of an S-curve. Fig. 7 is an enlarged transverse section of the lower pulley and cable retaining and protecting device. Fig. 8 is a like view of the same in position when the uppermost cable is in use on an S-curve, and Fig. 9 is a transverse section of part of the cable-retaining device.

In duplex-cable systems as heretofore constructed the two cables in the straight part of the track are placed alongside each other on vertically-disposed pulleys; but on curves the cables are arranged one above the other and are supported in the grooved rims of horizontally-disposed pulleys or wheels. Now it is evident that when the lowermost cable is taken up and used on a curve it strikes against and injures the uppermost cable. By a large number of cars passing in a short time over a curve and using the lowermost cable both cables, especially the one not used, are worn out by frequently striking one on the other, so as to be rendered useless in a short space of time. With the improvements presently to be described this difficulty is overcome, the cables being supported in such a manner as not to interfere one with the other when used.

The cable road is provided with the usual conduit or duct A, in which extend the two cables B and C, arranged alongside each other in the straight part of the tunnel and located one above the other on entering curves, as illustrated in the drawings. On ordinary quarter-curves the two cables B and C remain in this relative position throughout the curve; but on an S-curve the position of the cables is reversed at or near the middle, so that the former lower cable becomes the upper one and the former upper one the lower one, as plainly shown in Figs. 1 and 2. The cables leave the S-curve in this position and are then gradually again passed side by side on the straight track. On an S-curve, as shown in Figs. 1 and 2, the cables are passed through one-half of the curve on one side of a set of supporting devices D and during the remainder of the curve the cables are passed along and supported on a like set of supporting devices D', but on their other side. Between the adjacent two devices of the two sets the crossing or transposition of the two cables takes place, it, however, being understood that the cables do not touch each other in either normal positions shown or when the grip passes through the S-curve on one of the two cables B and C. On an ordinary quarter-curve the two cables pass along on one side of a set of devices D or D'. The number of devices in one set D or D' depends on the length of the curve, it being understood that one of each would be sufficient for very short S-curves. The cables B and C are adapted to be engaged by a grip of any approved construction, preferably, however, of the construction shown and described in the Letters Patent of the United States, No. 352,255, granted to me on the 9th day of November, 1886. The grip extends through the slot in the top of the conduit and is supported from and forms part of the car E, traveling on the track of the cable road in the usual manner.

The devices in the two sets are alike in construction, each consisting principally of a cable retaining and protecting device F, adapted to support that cable which is uppermost in either half of the curve, and of a grooved pulley G, located below the respective retaining device and adapted to support that cable which is in lowermost position. Thus if the car travels in the direction of the arrow $a'$ the cable B is retained in the retaining devices F of the set of devices D and the pulleys G of the set of devices D', while the cable C is supported on the pulleys G of the set of devices D and supported and retained in the devices F of the set of devices D'. Each grooved pulley G is mounted to turn on a vertically-arranged rod or spindle H, which also forms part of the retaining device F, the latter being in axial line with the pulley and above the same. The rod or spindle H is supported in a suitable framework I, located and secured in the conduit A.

Each retaining device F is provided with a disk J, mounted to turn loosely on a sleeve K, formed with annular flanges $K'$ and $K^2$ at its ends. The sleeve K is fitted to slide on the rod or spindle H and is connected at its upper end with a transversely-extending bar L, preferably made in two pieces bolted together, as is plainly illustrated in Figs. 4, 7, 8, and 9. The bar L is rigidly connected with a longitudinally-extending beam N, formed at its ends with bearings mounted to slide vertically on guide-rods I', supported on the frame I, previously mentioned.

On top of the disk J is adapted to rest the uppermost cable, the inward movement of which is limited by the cable abutting against the disk O, turning on top of the disk J and below a washer underneath the bar L. Above the latter is mounted to turn on the rod or spindle H a pulley P, formed with a downwardly-extending annular rim Q, passing over the ends of the bar L, as is plainly illustrated in Figs. 7 and 8.

In the front end of the bar L and at the bottom of the same is formed a recess $L'$, containing three balls R, $R'$, and $R^2$, of which the last two are of the same size and somewhat smaller in diameter than the ball R, which is located in the front part of the recess $L'$. The upward movement of the balls $R'$ and $R^2$ is limited by a projection $L^2$, which prevents the ball $R^2$ from passing upon the top of the front larger ball R, while the latter is free to rise and fall when the cable is passed in or out over the top of the disk J. The inner end of the recess $L'$ terminates near the edge of the disk O, as is plainly shown in Figs. 7 and 8. The front ball R is mounted to travel in an annular recess $J'$, formed in the top of the disk J near its outer edge. The front opening of the recess $L'$ is somewhat less than the diameter of the ball R, so that the latter cannot drop out of its recess, but permits the cable B to pass upon the top of the disk J to the rear of the said ball R, the latter rising during the time the cable moves inward upon the top of the disk J and to the rear of ball $R'$, the latter rising on top of the cable. When an outward pull is exerted on the cable B by the coming grip, then the cable passes over the disk J and underneath the balls $R'$ and R, of which the latter rises and $R'$ and $R^2$ drop. The cable then passes to the outside of the retaining device F, and when the car has passed this particular retaining device the cable B in assuming its normal position comes back to its original place by slipping under the balls R and $R'$ to the rear of the latter on top of the disk J and against the edge of pulley O. (See Fig. 7.) When the grip is not near the curve, each retaining device F rests on top of its pulley G, as is plainly shown in Fig. 6. When the grip nears the curve, the cable rises, thus lifting the entire first retaining device F, which by being mounted to slide vertically on the rods I' moves to a position to bring the cable B in line with the gripping-jaws of the cable-grip. (See left part of Fig. 3.) The grip in nearing the retaining device F pulls the cable B from out of the retaining device in the manner above described. This operation is repeated on each retaining device F in the set of devices D, and when the grip leaves the last one of said devices and nears the set of devices D', then the cable B is drawn from or lifted out of the grooves of the pulleys G, passed upward over the uppermost flanges of the said pulleys, over the beveled edge of the disk J, and then over the outside part of the ball R to pass finally on the flange Q of the pulley P. The flange Q is sufficiently high so that the cable does not pass above it, the upper edge of the said flange being above the gripping-jaws of the cable-grip. (See dotted lines in Fig. 7.) A like operation takes place when the cable C is the working cable and is picked up by the grip. The cable C is first, however, lifted out of the pulleys G and passed upon the flanges Q of the retaining devices F in the set of devices D and drawn out of the retaining devices F in the second set of devices D'. The lowermost flange of the pulley G for the lower cable is of sufficient size to conveniently retain the cable in position, the upper flange being shorter, so as to permit the cable to readily slip out of the groove when the grip approaches the curve. When the uppermost cable is not used, it rests in the position shown in Fig. 7—that is, it abuts on the disk O with the ball R' on top, as shown. When the ball R' is in this position, the ball R² is in a locking position for the ball R. Thus the latter cannot move inward or upward when pressed on from the outside—as, for instance, is the case when the lower cable is picked up by the grip, lifted over the uppermost flange of the pulley G, over the beveled edge of the disk J, and then over the outside part of the ball R to pass upon the flange Q of the pulley P, as above described. When the lowermost cable is thus picked up by the grip, it is not liable to come in contact with the uppermost cable, as the latter is in the rearmost position, is securely locked in place and protected in the retaining device F, and completely out of reach of the lowermost cable. Thus the two cables do not touch each other when the lowermost cable is picked up and raised above the other cable. When the grip is on the cable B and has left the last device D', the cable returns to the several pulleys G of the said devices D', and it first slips downward on the rim or flange Q, over the outside part of the ball R upon the beveled edge of the disk J, over the similarly-shaped upper flange of the pulley G, and into the groove in the latter, as shown in Fig. 7. The uppermost beveled flange of the pulley G is preferably in line with the bevel-edge of the disk J, so that the lowermost cable readily passes upward and downward from and toward its groove in the pulley G.

In order to prevent undue friction between the disk J, the balls R, R', and R², and the bar L, a counterbalancing-ball S is employed, mounted to travel in the recess J' in the disk J and held in a suitable recess L³ in the rear end of the bar L.

In order to conveniently guide the jaws of the cable-grip along the retaining device F, guide-rails T are provided, extending longitudinally in front of the said retaining device and suitably secured in the conduit A. Each guide-rail T lies close to the rim Q of the retaining device F, allowing the grip-jaws to strike the rim Q and at the same time guiding the pivoted grip along in the conduit A on the curves. On quarter-curves the retaining device F does not slide vertically to bring the uppermost cable in line with the jaws of the cable-grip, as the said retaining device is located sufficiently high to deliver the cable directly to the respective vertically-disposed pulley in the straight part of the track. (See Fig. 5.) The pulley G is located directly below the retaining device F, and its cable C passes straight to its vertically-disposed pulley in the straight part of the tunnel A. It is also understood that when the lowermost cable rises the retaining device F for the uppermost cable rests on top of the pulley G, and the cable in rising by the grip projecting and passing through the curved part of the tunnel does not rise above the upper edge of the flange or rim Q of the retaining device F. The uppermost cable always rests on top of the disk J against the disk O and under the ball R', which latter permits the uppermost ball R² to slide rearward to permit the front ball R to rise and fall when the cable is pulled out from the retaining device or pushed back into the same in the manner above described.

The mechanism for picking up the cable or throwing it off is not illustrated in the drawings, as it does not perform a necessary part in the operation of the device; but I employ, preferably, the throw-off and pick-up mechanism shown and described in an application for Letters Patent of the United States, Serial No. 386,212, filed by me on the 24th day of March, 1891, and allowed August 3, 1891, and patented December 15, 1891, No. 465,191.

Having thus described my invention, what I claim as new, and desire to secure by Letters Patent, is—

1. A cable-traction system provided with two sets of cable-supporting devices D and D', arranged on opposite sides of the cables, and each device of each set comprising a pulley and a retaining device located above the said pulley, substantially as shown and described.

2. In a cable-traction system, the combination, with two cables, of the two sets of cable-supporting devices D and D', located at opposite sides of the said cables, each device of the two sets being provided with a retaining device and a pulley located below the retaining device, the cables at the adjacent devices of the two sets of supporting devices passing and crossing from the retaining device of the one supporting device to the pulley of the other adjacent supporting device located at the opposite side of the cables, substantially as shown and described.

3. In a cable-traction system, a cable-supporting device comprising a pulley for one cable and a retaining and protecting device for the other cable, substantially as described.

4. A cable-traction system provided with a retaining and protecting device to support the uppermost cable while the other cable is in use, substantially as shown and described.

5. A cable-traction system provided with a pulley for the lowermost cable and a retaining device arranged above the said pulley and adapted to support the uppermost cable to permit the lowermost cable to pass from its pulley up onto the said retaining device without striking the uppermost cable on the latter, substantially as shown and described.

6. A cable-traction system provided with a retaining device comprising a revoluble disk, a ball held on top of the said disk, and a bar formed with a recess containing the said ball, the latter permitting the cable to pass upon the said disk below the said bar, substantially as shown and described.

7. A cable-traction system provided with a retaining device comprising a revoluble disk, a ball held on top of the said disk, a bar formed with a recess containing the said ball, the latter permitting the cable to pass upon the said disk below the said bar, a lock for the said ball and also held in the said recess, and a pulley held on top of the said disk and on which butts the cable, substantially as described.

8. A cable-traction system provided with a retaining device comprising a revoluble disk, a recessed bar arranged above the said disk, a ball held on top of the said disk in the said recess, and a pulley held above the said bar in axial line with the said disk, said pulley being formed with a flange extending over the ends of the said bar, substantially as shown and described.

9. A cable-traction system provided with a retaining device comprising a revoluble disk, a recessed bar arranged above the said disk, a ball held on top of the said disk in the said recess, a pulley held above the said bar in axial line with the said disk, said pulley being formed with a flange extending over the ends of the said bar, and locking-balls held in the said recess in the rear of the first-named ball, substantially as shown and described.

10. In a cable-traction system, the combination, with a grooved pulley for the lowermost cable, of a retaining device for the uppermost cable and arranged above and in line with the said pulley, substantially as shown and described.

11. In a cable-traction system, the combination, with a grooved pulley for the lowermost cable, of a retaining device for the uppermost cable and arranged above and in line with the said pulley, the said retaining device being mounted to slide vertically, substantially as shown and described.

12. In a cable-traction system, the combination, with a grooved pulley for the lowermost cable, of a retaining device for the uppermost cable and arranged above and in line with the said pulley, the said retaining device comprising a revoluble disk, a recessed bar fitted to slide vertically and adapted to carry along the said disk, and a ball held in the recess of the said bar and mounted on top of the said disk, and a lock, as described, for the said ball and arranged in the said recess, substantially as shown and described.

13. In a cable-traction system, the combination, with a grooved pulley for the lowermost cable, of a retaining device for the uppermost cable and arranged above and in line with the said pulley, the said retaining device comprising a revoluble disk, a recessed bar fitted to slide vertically and adapted to carry along the said disk, a ball held in the recess of the said bar and mounted on top of the said disk, and two smaller balls arranged in the said recess in the rear of the first-named larger ball, substantially as shown and described.

14. In a cable-traction system, the combination, with a grooved pulley for the lowermost cable, of a retaining device for the uppermost cable and arranged above and in line with the said pulley, the said retaining device comprising a revoluble disk, a recessed bar fitted to slide vertically and adapted to carry along the said disk, a ball held in the recess of the said bar and mounted on top of the said disk, two smaller balls arranged in the said recess in the rear of the first-named larger ball, and a second disk held on top of the first-named disk to form an abutment for the uppermost cable, substantially as shown and described.

15. In a cable-traction system, the combination, with a grooved pulley for the lowermost cable, of a retaining device for the uppermost cable and arranged above and in line with the said pulley, the said retaining device comprising a revoluble disk, a recessed bar fitted to slide vertically and adapted to carry along the said disk, a ball held in the recess of the said bar and mounted on top of the said disk, and a pulley mounted to turn loosely on top of the said bar and formed with a downwardly-extending flange passing over the ends of the said bar, and a lock, as described, for the said ball and arranged in the said recess, substantially as shown and described.

16. In a cable-traction system, the combination, with a grooved pulley for the lowermost cable, of a retaining device for the uppermost cable and arranged above and in line with the said pulley, the said retaining device comprising a revoluble disk, a recessed bar fitted to slide vertically and adapted to carry along said disk, a ball held in the recess of the said bar and mounted on top of the said disk, two smaller balls arranged in the said recess in the rear of the first-named larger ball, a second disk held on top of the said first-named disk to form an abutment for the uppermost cable, and a counterbalancing device for the said balls, substantially as shown and described.

GEORGE MULLER.

Witnesses:
THEO. G. HOSTER,
E. M. CLARK.